Patented Apr. 28, 1942

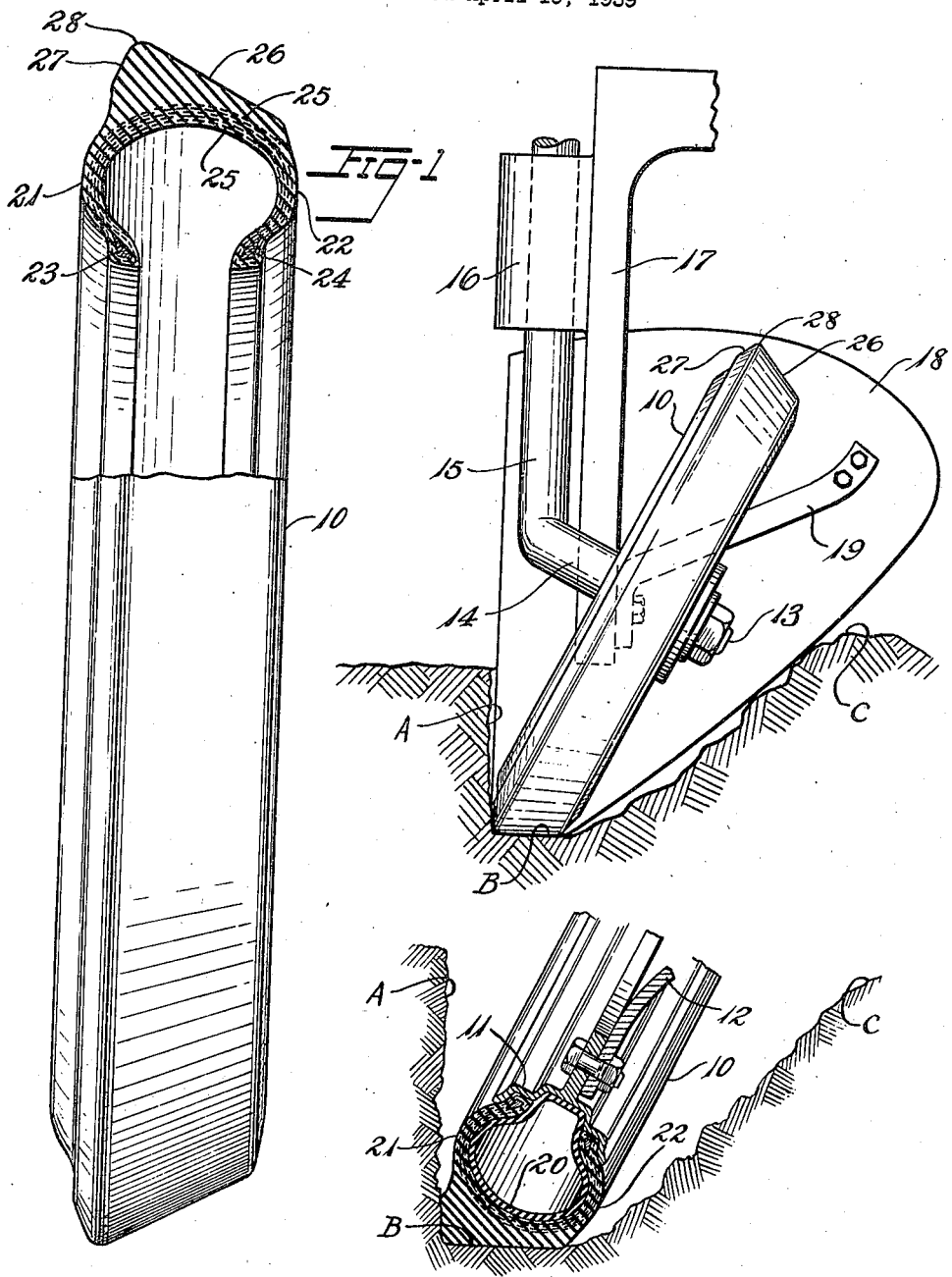

2,281,359

UNITED STATES PATENT OFFICE 2,281,359

PLOW TAIL WHEEL

Cecil E. Kenner, Akron, Ohio, assignor to The
B. F. Goodrich Company, New York, N. Y., a
corporation of New York Application April 19, 1939, Serial No. 268,755

5 Claims. (Cl. 152—352)

This invention relates to tires for agricultural implements, and especially for the tail wheels of plows.

The plow tail-wheel, which rides in the furrow behind the plow share or bottom and rotates upon an axis inclined to the horizontal so that radially the wheel is disposed substantially in the line of thrust from the action of the plowshare, heretofore has been of metal or other rigid material, and owing to its lack of any springing action in the wheel itself, has caused much jolting, resulting in erratic operation and at times excessive shaking of the plow apparatus and also the operator.

The advantages of a cushioned tire, especially a pneumatic tire, for tail-wheel operation are desirable. However, it has been found that when the conventional vehicle pneumatic tire has been tried for such operation certain difficulties have arisen, among which have been the tendency of such tire to climb undesirably up the furrow sidewall, with the result of uneven depth of plowing, and the further serious difficulty of excessive wear of the tire especially in the sidewall region that contacts the furrow wall, and in the tread region which, in the conventional tire, is not suited to operation on an obliquely rotating wheel. Difficulty has been encountered also as a result of excessive wear of such obliquely rotating wheel upon pavements when the plow has been towed to and from the fields.

The chief objects of the present invention are to provide a tire of improved construction for implement uses where an oblique tread face is desired, to provide a tire that overcomes the above-discussed and other difficulties when used for plow tail-wheel operation, to improve the operation of the plow, to provide improved wearing qualities of the tire, especially in the tread region thereof whether the tire is operated in the furrow or upon pavements, and to provide an improved pneumatic tire for the purpose, to provide protection of the sidewall portion of the tire from abrasive wear against the sidewall of the furrow, and to provide good stability of the tire.

These and other objects will be apparent from the following description, reference being had to the accompanying drawing in which:

Fig. 1 is an elevation, as viewed in the radial direction, of a tire constructed according to and embodying the invention, parts being broken away and sectioned.

Fig. 2 is a rear elevation of a plow assembly showing the improved tire in operation in a furrow.

Fig. 3 is a vertical section of a portion of the assembly of Fig. 2.

The improved tire, designated generally at 10, is mounted upon the rim 11 of a wheel disk 12 mounted for rotation upon a stub axle 13. The stub axle 13 is disposed obliquely with reference to the horizontal as shown in Fig. 2 and has a forwardly extending portion 14 integral with a vertical post 15 which is pivotally mounted in a bracket 16, the arrangement being such that the tail-wheel trails with a caster action behind the plow and supports a portion of the weight of the plow structure. Such plow structure may be of any suitable construction, including a frame 17 supporting a plowshare or bottom 18 suitably braced at 19. The inclination of the stub axle 13 to the horizontal is such that the obliquely downward radial direction of the wheel corresponds substantially with the direction of thrust from the share 18 during plowing. The resulting furrow comprises a substantially vertical side wall indicated at A joining with a substantially horizontal bottom portion indicated at B, the soil being piled up to the right at C as shown in Figs. 2 and 3.

The rim 11 may be of conventional construction of the drop-center type for the reception of the tire, which preferably includes an inner-tube 20 for pneumatic operation. The tire comprises a body including sidewalls 21, 22, inextensible beads 23, 24, and plies 25, 25 of rubberized reinforcing fabric extending from bead to bead. The tire preferably is somewhat flattened in the radial direction as shown in Figs. 1 and 3 so that the width of the tire below the sidewalls is greater than the radial depth from the bead seat to the reinforcing plies at their radially outermost position, the bead seats however being of somewhat less width than the body width. This makes for stability of the tire despite its oblique disposition.

The tire tread, which may be of the usual rubber composition, is molded with a face 26 which is flat in cross-section and is obliquely disposed with reference to a radial plane of the tire at such an angle that the face 26 will bear evenly upon the surface of the pavement or the furrow bottom when the tire is mounted upon the wheel. The tread is formed with a second obliquely disposed face 27, also flat in cross section and disposed substantially at right-angles to the face 26. It is preferred that the two faces 26 and 27 intersect in a slightly rounded edge 28 adapted to fit into the corner of the furrow where the furrow bottom B joins the vertical sidewall A.

The tread preferably projects outwardly from the tire body to such an extent that the plane of the face 27 lies well clear of the sidewall 21. This has the advantage that the face 27, upon engaging the sidewall A of the furrow, guards the sidewall 21 of the tire from abrasive action against the sidewall of the furrow. Thus, the sidewalls of the tire are able to perform their function of flexing without abrasive wear.

The tread face 26 is disposed preferably to be intersected by the central radial plane of the tire so as to take the thrust most effectively. It is preferred that such intersection occur close to or at the ridge 28, which has the advantage that the thrust will direct the ridge 28 constantly and effectively toward the intersection of the furrow side wall and bottom, although the location of this intersection may be considerably varied, as desired.

Both tread faces 26 and 27, being transversely flat, and preferably smooth throughout, are adapted to engage the furrow walls substantially without acquiring packed soil upon them, such as would adversely affect the depth at which the plow share is intended to operate. This construction also makes possible a maximum area of contact of the tread face 26 against the bottom of the furrow and also against a pavement surface, so that scuffing resulting from the angular disposition of the tire is held to a minimum. Tires constructed in accordance with the invention have been found to be very durable in use. While the improved tire has probably its chief field of use in its application to plow-tail wheels, the tire has other applications also where an oblique disposition of the tire is desired or where the ground is not level.

Variations may be made without departing from the scope of the invention as it is defined in the following claims.

I claim:

1. A pneumatic tire for an agricultural implement wheel, for guiding and supporting the wheel during earth-working operations and for pneumatically cushioning it from ground or pavement, said tire comprising an annular inflatable body having a wheel-engaging portion and side wall portions, and a tread of rubber-like material integral with said body comprising a major conical tread face intersecting the central radial plane of the tire so as to extend axially beyond said plane in opposite directions and having an axis coincident with that of the wheel and arranged to provide cushioning support of the wheel from the ground, and a minor conical tread face having the same axis as the first with said tread faces converging to one side of the central radial plane of the tire, the sidewalls of the tire being spaced laterally inward of the sides of the angle formed by said conical tread faces.

2. A pneumatic tire for an agricultural implement wheel, for guiding and supporting the wheel during earth-working operations and for pneumatically cushioning it from ground or pavement, said tire comprising an annular inflatable body having a wheel-engaging portion and side wall portions, and a tread of rubber-like material integral with said body comprising a major conical tread face intersecting the central radial plane of the tire so as to extend axially beyond said plane in opposite directions and having an axis coincident with that of the wheel and arranged to provide cushioning support of the wheel from the ground, and a minor conical tread face having the same axis as the first with said tread faces converging at substantially a right angle to one side of the central plane of the tire, the sidewalls of the tire being spaced laterally inward of the sides of the angle formed by said conical tread faces.

3. A pneumatic tire for an agricultural implement wheel mounted for rotation about an axis inclined to the horizontal, for guiding and supporting the wheel during earth-working operations and for pneumatically cushioning it from ground or pavement, said tire comprising an annular inflatable body having a wheel-engaging portion and side wall portions, and a tread of rubber-like material integral with said body and comprising a major conical tread face intersecting the central radial plane of the tire so as to extend axially beyond said plane in opposite directions and having an axis coincident with that of the wheel and arranged to provide broad cushioning support of the inclined wheel from the ground, and a minor conical tread face having the same axis as the first with said tread faces converging at substantially a right angle to one side of the central plane of the tire, the sidewalls of the tire being spaced laterally inward of the sides of the angle formed by said conical tread faces.

4. A pneumatic tire for an agricultural implement wheel mounted for rotation about an axis inclined to the horizontal, for guiding and supporting the wheel during earth-working operations and for pneumatically cushioning it upon ground or pavement, said tire comprising an annular inflatable body having a wheel-engaging portion and outwardly curved and flexible sidewall portions, and a tread of rubber-like material integral with said body comprising a wide conical tread face intersecting the central radial plane of the tire so as to extend axially beyond said plane in opposite directions and having an axis coincident with that of the wheel, said tread face being adapted to provide broad cushioning support of the inclined wheel from the ground, and a second conical tread face having the same axis as the first with its conical face inclined in the opposite direction and intersecting the first-named conical tread face axially at one side of said central radial plane, the sidewalls of the tire being spaced laterally inward of the sides of the angle formed by said conical tread faces.

5. A pneumatic tire for an agricultural implement wheel mounted for rotation about an axis inclined to the horizontal, for guiding and supporting the wheel during earth-working operations and for pneumatically cushioning it upon ground or pavement, said tire comprising an annular inflatable body of greater interior transverse width than radial depth in cross-section having a wheel-engaging portion and outwardly curved and flexible sidewall portions, and a tread of rubber-like material integral with said body comprising a wide conical tread face intersecting the central radial plane of the tire so as to extend axially beyond said plane in opposite directions and having an axis coincident with that of the wheel, said tread face being adapted to provide broad cushioning support of the inclined wheel from the ground, and a second conical tread face having the same axis as the first with its conical face inclined in the opposite direction and intersecting the first named conical tread face axially at one side of said central radial plane, the sidewalls of the tire being spaced laterally inward of the sides of the angle formed by said conical tread faces.

CECIL E. KENNER.